United States Patent [19]

Kohli

[11] 4,406,279

[45] Sep. 27, 1983

[54] SUNRAY CAPTOR

[75] Inventor: Benjamin Kohli, Bex, Switzerland

[73] Assignee: Ener-Nat SA, Switzerland

[21] Appl. No.: 278,714

[22] Filed: Jun. 29, 1981

Related U.S. Application Data

[63] Continuation-in-part of Ser. No. 809, Jan. 4, 1979, abandoned.

[30] Foreign Application Priority Data

Jan. 10, 1978 [CH] Switzerland .......................... 210/78

[51] Int. Cl.³ ................................................ F24J 3/02
[52] U.S. Cl. .................................. 126/450; D25/74; 160/391; 160/395
[58] Field of Search ................ 126/450, 426; D25/74; 52/222; 160/391, 392, 395

[56] References Cited

U.S. PATENT DOCUMENTS

| 2,839,126 | 6/1958 | O'Neill .............................. 160/392 |
| 3,300,052 | 1/1967 | Steinveit ............................ 160/395 |
| 3,788,216 | 1/1974 | Lambert ......................... 160/395 X |
| 3,987,835 | 10/1976 | Bloomfield ........................ 160/392 |
| 4,131,111 | 12/1978 | Hopper .............................. 126/450 |
| 4,153,981 | 5/1979 | Stuppy ........................... 160/395 X |

FOREIGN PATENT DOCUMENTS

| 2750561 | 5/1978 | Fed. Rep. of Germany ...... 160/392 |
| 1432172 | 6/1966 | France ................................ 160/395 |

Primary Examiner—Samuel Scott
Assistant Examiner—Kenichi Okuno
Attorney, Agent, or Firm—Lerner, David, Littenberg, Krumholz & Mentlik

[57] ABSTRACT

Apparatus for stretching sheets of synthetic material across rigid frames, such as those used in sunray captors, are disclosed. The apparatus includes at least one lateral U-shaped groove extending perpendicularly from the plane of an upstanding substantially planar rigid frame base, the U-shaped grooves including a pair of lateral arms with free ends and a central portion comprising the rigid frame base, the free ends converging towards each other to define a waist portion for the U-shaped groove, and first and second rigid rods disposed within the U-shaped groove and lockable therein, the first rigid rod including a pair of concave symmetrical surfaces on opposing portions thereof defining a waist portion, and a second rigid rod being substantially cylindrical and including a convex exterior surface whereby a sheet of synthetic material may be locked tightly in position within the U-shaped groove by passing at least partially around one of the rigid rods and then between those rods so that the sheet material is fixed in position between the convex exterior surface of the second rigid rod and one of the concave grooves defining the waist portion of the first rigid rod and between one of the rods and the converging free end of the lateral arm of the adjacent U-shaped groove.

7 Claims, 7 Drawing Figures

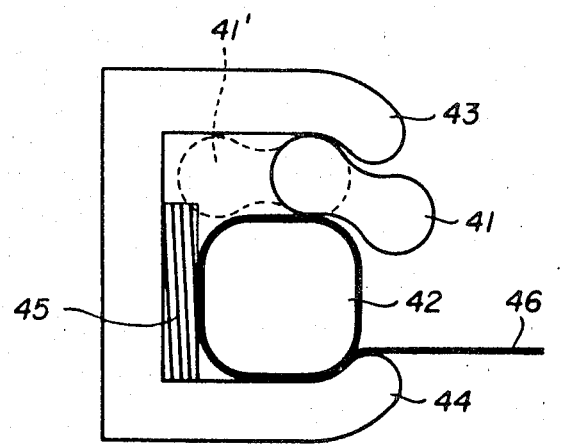
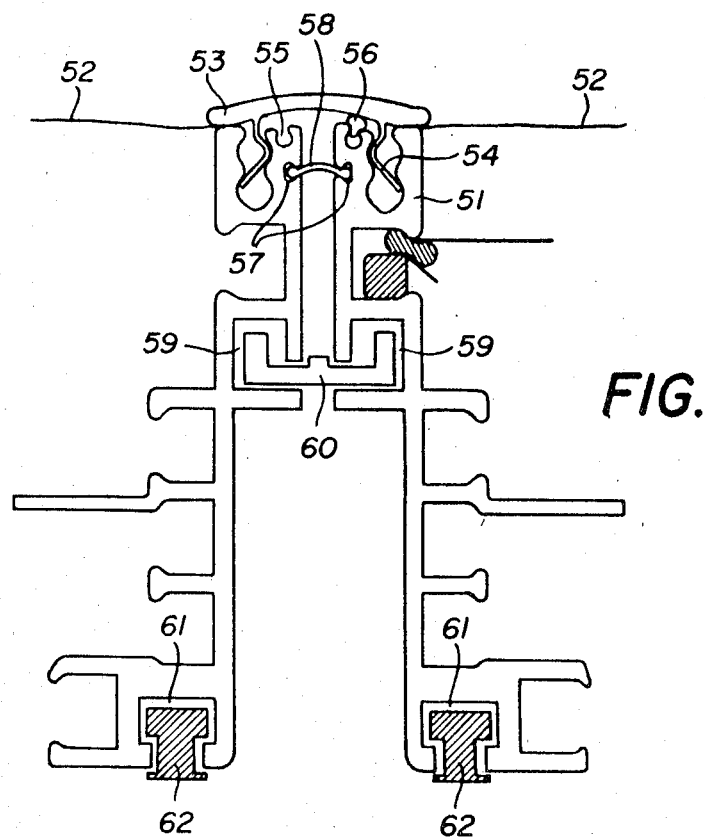

SUNRAY CAPTOR this is a continuation-in-part of application Ser. No. 000,809, filed Jan. 4, 1979, now abandoned.

FIELD OF THE INVENTION

The present invention concerns a sunray captor comprising a rigid frame and at least one sheet of synthetic material, transparent to the sun's rays, stretched across the frame.

BACKGROUND OF THE INVENTION

Sunray captors, such as those described in Swiss Pat. No. 610 091, made up of a housing covered over with a single or double transparent plate in which a liquid circulates for conveying the trapped calories are well-known. The transparent plates are often ordinary panes of glass and are inconvenient in that they are extremely heavy. Consequently special supports are necessary, particularly when they are to be placed on the roof of a house, since the framework must be strong enough in order to bear heavy loads.

In order to avoid these disadvantages, sunray captors have been made which are covered over with a sheet of synthetic material, transparent to infra-red rays, which is stretched across a frame, preferably of a light alloy. Nevertheless the existing metal profiles do not easily lend themselves to such an assembly and the manufacturers are obliqued to use complicated artificial means in order to insure the tightening of the sheet on its support.

French Pat. No. 2,334,067 describes a sunray captor in which the transparent component is a film of synthetic material which is fixed on a rigid frame by means of blocking elements comprising a U-shaped groove into which an inverted U-shaped profile (blocking profile) is fitted. This device serves the sole function of holding the end of the film. The inconveniences of this type of device would thus be obvious to one of ordinary skill in the art. They include the fact that the front of the blocking profile must be inserted into the U-shaped groove by force, i.e., the open end of the U which is provided in the supporting frame. However, during this insertion, no means are provided for holding the supple film in position. On the other hand, in order to secure the film which has previously been tightened by the operator, into a locked position, the blocking profile must be adjusted and the film must, during the positioning of the profile, be manually maintained in a stretched condition. Moreover, the precision with which these two elements cooperate with each other in order to serve in this capacity will determine how well the fiber is blocked into position, and the manufacture of same will therefore be relatively expensive.

French Pat. No. 1,432,172 describes a means of fixing a sheet of supple synthetic material into a U-shaped groove which is narrowed down at its opening, principally by blocking a folded part thereof inside the U-shaped groove. This folded part is created by inserting a cord and a cable in a hem which is formed at the end of the sheet. This folded part can also possibly be blocked by a separate complementary member which is also inserted into the U-shaped groove.

The blocking device of this French patent thus only ensures the statici function of holding the sheet in place, and in no way allows a dynamic tension to be exerted on the edges of the sheet, so as to ensure its tightness on a frame. Moreover, this fixing means also requires the preliminary manufacture of a hem, and the tightness of the sheet therefore depends exclusively on the unchangeable positon of this hem. This device is thus unsuitable for fixing a transparent sheet on a rigid frame of fixed dimensions.

SUMMARY OF THE INVENTION

In accordance with the present invention a remedy for these disadvantages has now been discovered by making a sunray captor based on a new metal profile of a light alloy which permits the assembly of one or several sheets of transparent synthetic material in a simplified manner. This metal frame comprises also a locking device which guarantees the uniform tightness of the sheet even after having been used for a relatively long time.

Bearing these objects in mind, in accordance with one aspect of the present invention, an apparatus is provided for stretching at least one sheet of synthetic material transparent to sun rays across a rigid frame for use in a sunray captor in which the rigid frame is an upstanding, substantially planar rigid frame base member. The apparatus provided includes at least one lateral U-shaped groove extending perpendicularly from the plane of the rigid frame base member, the U-shaped groove including a pair of lateral arms including free end portions defining an opening therebetween and a central portion comprising the rigid frame base member, the free end portions of the lateral arms converging towards each other so as to define a waist portion of the U-shaped groove, first and second rigid rod members disposed within the U-shaped groove and dimensioned so that they may be locked within the waist portion of the U-shaped groove, the first rigid rod member including a pair of concave symmetrical surfaces on opposing portions thereof defining a waist portion of that first rigid rod member, the second rigid rod member being substantially cylindrical and including a convex exterior surface whereby the sheet of synthetic material may be locked tightly in positon within the U-shaped groove by passing it at least partially around one of the first and second rigid rod members and then between the first and second rigid rod members so that the sheet may be fixed in position between the convex exterior surface of the second rigid rod member and one of the concave surfaces defining the wasit portion of the first rigid rod member, and between the said one of the first and second rigid rod members and the adjacent one of the converging free ends of the lateral arms of the U-shaped groove.

In accordance with one aspect of this embodiment of the present invention, the second rigid rod member is hollow, and includes an elongated slot adapted to permit insertion of the end of the sheet of synthetic material therein.

In accordance with another aspect of this embodiment of the apparatus of the present invention auxiliary locking means are provided for acting upon the second rigid rod member in order to urge the second rigid rod member away from the central portion of the U-shaped member and towards the waist portion of the U-shaped member. In accordance with this embodiment of the apparatus of the present invention the auxiliary locking means preferably includes a threaded opening in the central portion of the U-shaped member and locking screw means cooperating with the threaded opening whereby the locking screw means can be adjustably moved towards the second rigid rod member.

In accordance with another aspect of this embodiment of the apparatus of the present invention the auxiliary locking means comprises pressure spring meeans located between the central portion of the U-shaped member and the second rigid rod member.

In accordance with another embodiment of this aspect of the apparatus of the present invention the apparatus includes a plurality of the lateral U-shaped grooves, and each includes a first and second rigid rod member so that a plurality of the sheets of synthetic material can be stretched across the rigid frame. In accordance with another embodiment thereof the rigid frame includes a pair of rigid frames so that the sheet of synthetic material can be stretched therebetween.

In accordance with another aspect of the present invention a sunray captor is provided including a pair of one piece upstanding substantially planar rigid frame base members and a sheet of synthetic material stretched therebetween. Each of the rigid frame base members includes at least one lateral U-shaped groove extending perpendicularly from the planes of the rigid frame base members, each of the U-shaped grooves including a pair of lateral arms including free end portions defining an opening therebetween, and a central portion comprising the rigid frame base members, with the free end portions of the lateral arms converging towards each other so as to define a waist portion of the U-shaped grooves. Within each of these U-shaped grooves are included first and second rigid rod members dimensioned so as to be lockable wihtin the waist portion of the U-shaped grooves, the first rigid rod member including a pair of concave symmetrical surfaces on opposing portions thereof defining a waist portion of the first rigid rod member, the second rigid rod member being substantially cylindrical and including a convex exterior surface whereby the sheet of synthetic material may be locked tightly in positon between each of the U-shaped grooves by passing at least partially around one of the first and second rigid rod members therein and then between the first and second rigid rod members so that the sheet material may be fixed in position between the convex exterior surface of the second rigid rod member and one of the concave grooves defining the waist portion of the first rigid rod member, and between the one of said first and second rigid rod members and the adjacent one of the converging free ends of the lateral arms of the U-shaped grooves, and absorber means mounted between the frame members and underneath the sheet of synthetic material stretched therebetween, the absorber means including heat transfer means for collecting and transferring heat therefrom.

In one embodiment of this aspect of the apparatus of the present inventon the one-piece frame member includes a second U-shaped groove which, in this case, is located along one of the longitudinal edges of the rigid frame base member, in this case the opening of the U-shaped groove faces in a direction substantially parallel to the plane of the rigid frame base member.

BRIEF DESCRIPTION OF THE DRAWINGS

A preferred embodiment of the sunray captor according to the invention is described below with reference to the attached drawing on which:

FIG. 4 is an enlarged side view of yet another production example of the locking device equipped with another device ensuring its blocking in a locked position;

FIG. 5 is a side, cross-sectional view of two frame members of the solar panels of the present invention in a side-by-side relationship;

DETAILED DESCRIPTION

Figure 1:
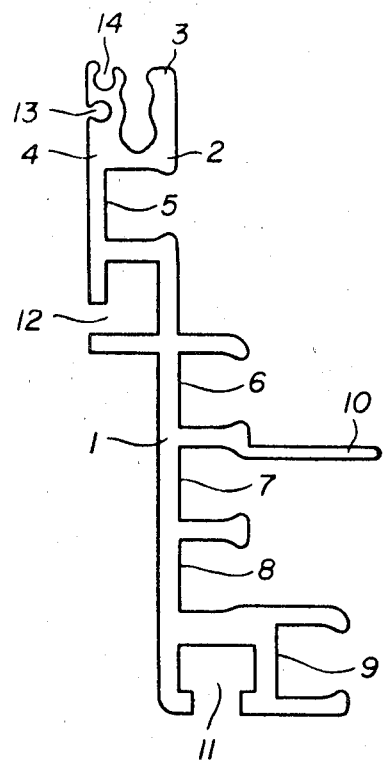
FIG. 1 is a side cross-sectional view of the light alloy profile as used to make the sunray captor.

With reference to FIG. 1, the profile prepared from a light alloy for manufacturing the frame on which are mounted the different elements of the captor which serve to retrieve the solar energy takes the form of a wide strip 1 having, at its uppermost end, a member 2 having in general the form of a U whose free arms 3 and 4 are at least approximately parallel to the plane of the strip 1. The frame also includes a certain additional number of U-shaped lateral grooves (5, 6, 7, 8 and 9) whose free arms are at least approximately perpendicular to the plane of the strip 1. These U-shaped lateral grooves are preferably all the same size, and comprise at their open ends a waist portion whose role will be explained with reference to FIGS. 2, 3 and 4. The lower lateral arm of the U-shaped lateral groove 6 is extended by a plate 10 which, for example, is to bear a blackened aluminum or copper plate which is intended to absorb solar energy and then pass it on to a cooling circuit which can be made up of a roll of tubes tightly bound to this plate. These elements, already well known, are not represented. The lowermost edge of the profile includes another opening 11 in the form of a U which allows the assembly of the frame of this sunray captor to be mounted on a rail with the appropriate forms and sizes. Lastly, the outside of the profile includes several additional openings 12, 13 and 14 for the mounting of different joints and a clasp acting as a cover plate between two sunray captors placed side by side.

Figure 2:
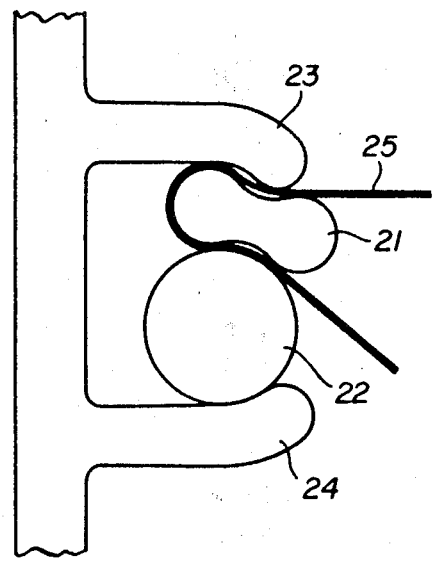
FIG. 2 is an enlarged view of a production example of the locking device ensuring the fixing of the sheets of transparent synthetic material.

The U-shaped lateral grooves having lateral arms perpendicular to the plane of the profile cooperate with a first rod 21 and a second rod 22, illustrated in FIG. 2, which are introduced between the appreciably parallel arms 23 and 24 of the U-shaped lateral grooves. As this enlarged view shows, the free ends of the lateral arms 23 and 24 are slightly curved towards the interior in such a way that they form a waist portion at the opening of the U-shaped lateral groove, the distance separating the lateral arms 23 and 24 at their free ends being less than the distance separating them at their base. The first rod 21 itself compises a waist portion close to its longitudinal axis, which is extended by two cylindrical parts placed on both sides of the waist portion. This waist portion is defined by two concave grooves placed symmetrically on both sides of the rod. The concave grooves on the first rod 21 have a form which corresponds approximately to the curved free end of the lateral arm 23 of the lateral U-shaped groove. The second rod 22 is cylindrical. The two rods are sized so as to cooperate in blocking the opening of the U-shaped lateral groove when one of them is pulled or pushed in the direction of this opening. This locking device allows the fixing and stretching of a sheet, for example, a sheet of synthetic material, transparent to the sun's rays. This device operates in the following manner: a sheet 25 is passed between the free end of the lateral arm 23 of the U-shaped lateral groove and one of the concave grooves of the first rod 21. This sheet 25 is then encircled about the rear semi-cylindrical portion of the first rod 21 and passes between the other concave groove of the first rod 21 and the part of the lateral surface of the said second cylindrical rod 22 situated opposite this other concave groove. When the sheet 25 is put into place and stretched over its frame, the intrinsic tightening of this sheet drives the rod 21 towards the opening of the U-shaped lateral groove and, by friction, draws the second rod 22 in this same direction. But as the sum of the diameter of the rod 22 and the section of the waist portion of the rod 21 is greater than the distance separating the free ends of the lateral arms 23 and 24 of the U-shaped lateral groove, there results a blocking at the opening of this groove causing the locking into position of sheet 25.

In this illustrated embodiment the rods 21 and 22 are both solid, the rod 21 being obtained preferably by crushing a cylindrical part by means of a milling procedure.

Figure 3:
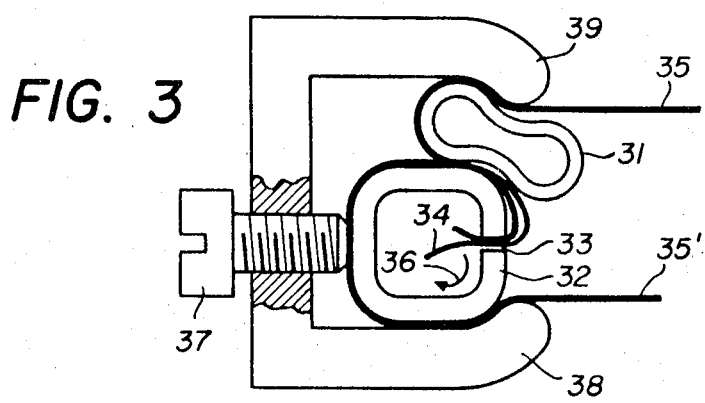
FIG. 3 is an enlarged side view of another production example of the locking device equipped with a blocking device in a locked position.

With reference to FIG. 3, rods 31 and 32 are hollow tubes, the rod 32 having an approximately square cross-section, the corners of which are rounded. Moreover, in this illustrated embodment, rod 32 has a longitudinal slot 33 on one of its sides for receiving the free end 34 of a transparent sheet 35. In order to tighten this transparent sheet, the free end 34 is inserted in the longitudinal slot 33 of rod 32, and in addition, the transparent sheet can also be encircled around this rod in the direction of the arrow 36 until the sheet 35 is sufficiently tight.

The sheet 35 can be replaced by two sheets 35 and 35', one of which 35 is placed as mentioned above and the other 35' passes behind rod 32 and the lateral arm 38 of the lateral U-shaped groove. In this case, the first sheet is held on the one hand between the lateral arm 39 of the U-shaped lateral groove and the rod 31 and on the other hand between the two rods 31 and 32. The second sheet will be held on the one hand between the lateral arm 38 and rod 32 and on the other hand between rods 31 and 32. The sheets 35 and 35' together can also be rolled around the rod 32 and introduced in the opening 33. In order to increase the security of use and to guarantee that sheets 35 and 35' are kept tight, one or several locking screws 37 can be provided to drive the rod 32 in the direction of the opening of the U-shaped groove and to ensure efficient locking of this opening by means of rods 31 and 32 blocked by the waist portion at the free ends of the lateral arms 38 and 39.

With reference to FIG. 4, the rods 41 and 42, which can be solid or hollow, ensure the locking of the opening between the lateral arms 43 and 44 of the U-shaped lateral groove by means of a spring 45 which has the same functions as the locking screw 37 illustrated by FIG. 3. In this embodiment, a sheet 46 is rolled several times around rod 42 and remains blocked between a rounded corner of the rod 42 and the free end of the lateral arm 44 of the U-shaped lateral groove.

A possible position 41' of the first rod 41 is represented by a dotted line. This placement of the rod 41' is not limited to the embodiment illustrated by this figure, but could be used in all the other embodiments described.

FIG. 5 shows two solar panels in accordance herewith placed side by side, each of which comprises a frame having the profile described above. In each of the two captors the U-shaped groove 51 is intended to receive both the free end of a sheet of transparent synthetic material 52 and a clamp 53. The purpose of clamp 53 is to assemble the two panels side by side to ensure that they are firmly affixed to each other, to keep the sheets 52 tight, as well as to act as a cover joint which bridges the junction zone of two such captors. The inside of the U-shaped grooves 51 comprise a number of depressions which cooperate with elbow clips 54 of clamp 53 in order to hold sheets 52. A cavity 55 is also provided to ensure imperviousness between the captors and clamp 53, which serves as a cover-joint. This longitudinal cavity 55 is intended to receive a joint 56 which is slightly crushed when clamp 53 is put into place. Another cavity 57 is provided on the outside lateral edge of the frame of the captors to allow the introduction of a joint 58 made up of an elastic strip edged on each side by a fillet. These fillets are introduced respectively into the two cavities 57 of two adjacent captors in order to perfect the imperviousness of the juncture of these two captors. The two openings 59 on the outside of the profile which serves as the rigid frame base member hereof, allow for the introduction of a U-shaped metal rail 60 which completes the rigid junction of the two adjacent captors. At the lowermost end of the frames there is another opening 61 which has a cross-section corresponding to that of an interdependent rail 62 with a support (not shown) on which the captors can be placed. These rails 62 may be mounted, for example, on the framework of a house intended to bear the captors, the captors being slid onto these rails until they occupy the desired position. The rail 60 which connects different elements together, is then put into place, the imperviousness of the junctures being ensured by the different joints and the cover-joints already described.

Figure 6:
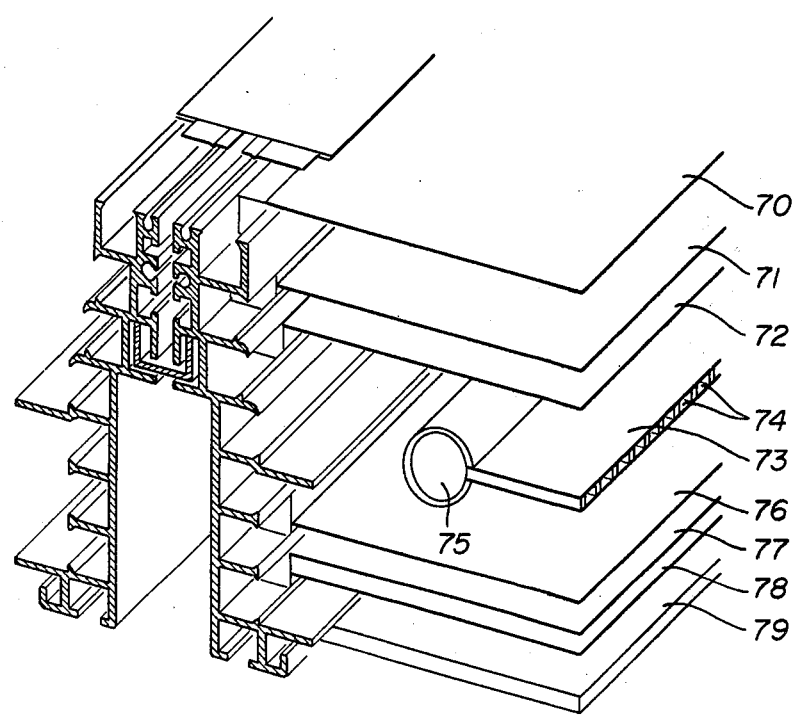
FIG. 6 is a perspective, partially sectional, side view of a solar panel prepared from the frame members of the present invention.

FIG. 6 shows a sunray captor prepared from the frame members hereof as discussed above. For purposes of simplification the U-shaped groove 51 of FIG. 5 has been replaced in FIG. 6 by a U-shaped groove identical to the other U-shaped grooves discussed above. The capacity of the frame for films has also been increased by adding another U-shaped groove between the U-shaped grooves 5 and 6 of FIG. 1.

The captor preferably comprises a first transparent sheet which is extremely strong and weather resistant, which can be a sheet 70 of TEDLAR commercialized by Dupont de Nemours. The next two sheets 71 and 72 are preferably of a weather resistant synthetic material having a high heat-resistance and having a high transparency coefficient as for example a film of TEFLON. The absorber 73, which is a conventional absorbing medium known to those of ordinary skill in this art, is made, for example, of an alveolar synthetic material, encased in the mass comprising a multitude of parallel canals 74 connected to a conduit at the end 75, which is mounted between the frames but beneath sheets 70–72, also in a conventional manner. A fluid can thus flow through this conduit for the purpose of removing from the captor heat collected by the absorber 73. The film 76 is a reflecting film intended to reflect the infrared rays emitted by the absorber 73. Films 77 and 78 are made of any synthetic material and are intended to constitute air beds which well insulate the interior of the captor with respect to the exterior. The final layer 79 is an insulator such as expanded polystyrene, fibre glass or similar materials.

Figure 7:
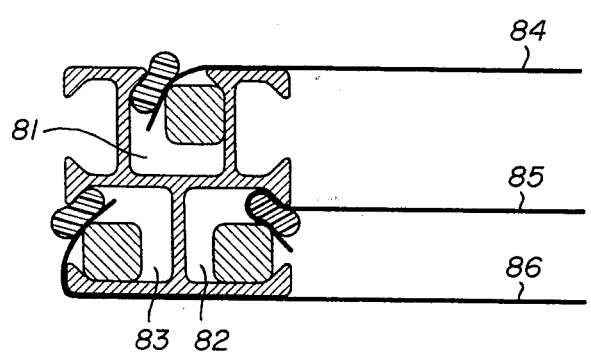
FIG. 7 is a side, cross-sectional view of another embodiment of the frame members of another sunray captor of the present invention.

The frame described above is particularly adapted to the production of a calory transport vehicle captor. For direct heating or the production of translucent coverings, however, the frame can be simplified. Such a frame can then be used to cover greenhouses or verandas, and is described with reference to FIG. 7. This frame comprises three U-shaped grooves 81, 82 and 83, each of which can be used to fix a transparent film 84, 85 and 86, respectively. Of course, it is possible to use only one or two U-shaped grooves and thus produce a direct captor with one or two films. For a greenhouse, two layers are usually sufficient. If superior insulation is required, three layers of film are used which allows two imprisoned air beds. The direct captors can also be used in liaison with an outside absorber such as the wall of a tank painted black.

The captors described above are particularly advantageous because they are light and because their frames are specially made so that the assembly of different mass-produced captors can be carried out rapidly, without special tools and so that the liaisons between captors are impervious and strong.

What is claimed is:

1. Apparatus for stretching at least one sheet of synthetic material transparent to sun rays across a rigid frame for use in a sunray captor wherein said rigid frame comprises at least one upstanding substantially planar rigid frame base member, said apparatus comprising at least one lateral U-shaped groove extending perpendicularly from the plane of said rigid frame base member, said U-shaped groove including a pair of lateral arms including free end portions defining an opening therebetween and a central portion comprising said rigid frame base member, the free end portion of said lateral arms converging towards each other so as to define a waist portion of said U-shaped groove, and first and second rigid rod members disposed within said U-shaped groove and dimensioned so as to be lockable within said waist portion of said U-shaped groove, said first rigid rod member including a pair of concave symmetrical surfaces on opposing portions thereof defining a waist portion of said first rigid rod member, and said second rigid rod member being substantially cylindrical and including a convex exterior surface whereby said sheet of synthetic material may be locked tightly in position within said U-shaped groove by passing it at least partially around one of said first and second rigid rod members and then between said first and second rigid rod members so that said sheet of material may be fixed in position between the convex exterior surface of said second rigid rod member and one of the concave grooves defining the waist portion of said first rigid rod member, and between said one of said first and second rigid rod members and one of said converging free ends of said lateral arms of said U-shaped groove.

2. The apparatus of claim 1 including a plurality of said lateral U-shaped grooves each including said first and second rigid rod members whereby a plurality of said sheet of synthetic material may be stretched across said rigid frame base member.

3. The apparatus of claim 1 wherein said rigid frame base member includes a pair of said rigid frame base members whereby said sheet of synthetic material may be stretched therebetween.

4. The apparatus of claim 1 wherein said second rigid rod member is hollow and includes an elongated slot adapted to permit insertion of the end of said sheet of synthetic material therein.

5. The apparatus of claim 1 including auxiliary locking means acting upon said second rigid rod member so as to urge said second rigid rod member away from said central portion of said U-shaped groove and towards said waist portion of said U-shaped groove.

6. The apparatus of claim 5 wherein said auxiliary locking means includes a threaded opening in said central portion of said U-shaped groove and locking screw means cooperating with said threaded opening whereby said locking screw means may be adjustably moved towards said second rigid rod member.

7. The apparatus of claim 5 wherein said auxiliary locking means comprises pressure spring means located between said central portion of said U-shaped groove and said second rigid rod member.

* * * * *